United States Patent
Chen et al.

(10) Patent No.: US 10,638,471 B2
(45) Date of Patent: *Apr. 28, 2020

(54) LOW LATENCY GROUP ACKNOWLEDGEMENTS

(71) Applicant: QUALCOMM Incorporated, San Diego, CA (US)

(72) Inventors: Wanshi Chen, San Diego, CA (US); Aleksandar Damnjanovic, Del Mar, CA (US); Hao Xu, Beijing (CN); Shimman Arvind Patel, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,235

(22) Filed: Oct. 8, 2018

(65) Prior Publication Data
US 2019/0116584 A1 Apr. 18, 2019

Related U.S. Application Data

(63) Continuation of application No. 15/005,289, filed on Jan. 25, 2016, now Pat. No. 10,098,099.
(Continued)

(51) Int. Cl.
*H04W 56/00* (2009.01)
*H04W 72/04* (2009.01)
(Continued)

(52) U.S. Cl.
CPC ......... *H04W 72/042* (2013.01); *H04L 1/1621* (2013.01); *H04L 1/1893* (2013.01); *H04W 72/0446* (2013.01)

(58) Field of Classification Search
CPC ............ H04W 72/042; H04W 72/0446; H04L 1/1621; H04L 1/1893
(Continued)

(56) References Cited

U.S. PATENT DOCUMENTS

| 10,098,099 B2 | 10/2018 | Chen et al. |
| 2009/0175245 A1* | 7/2009 | Harada ................. H04L 1/0007 370/336 |

(Continued)

FOREIGN PATENT DOCUMENTS

| CN | 101151818 A | 3/2008 |
| CN | 101414900 A | 4/2009 |

(Continued)

OTHER PUBLICATIONS

Ericsson: "New SI Proposal: Study on Latency Reduction Techniques for LTE", 3GPP Draft, RP-142025 New SI Proposal Study on Latency Reduction Techniques for LTE, 3rd Generation Partnership Project (3GPP), Mobile Competence Centre 650, Route Des Lucioles, F-06921 Sophia-Anti vol. TSG RAN, No. Maui, USA; Dec. 8, 2014-Dec. 11, 2014 Dec. 2, 2014 (Dec. 2, 2014), XP050898705, Retrieved from the Internet: URL:http://www.3gpp.org/ftp/Meetings_3GPP_SYNC/RAN/Docs/ [retrieved on Dec. 2, 2014] Chapter 4.
(Continued)

*Primary Examiner* — Sai Ming Chan
(74) *Attorney, Agent, or Firm* — Anthony R. Morris

(57) ABSTRACT

Certain aspects of the present disclosure provide techniques that may be used for low latency communications. For example, aspects allow a single group acknowledgement to be used to acknowledge a plurality of low latency transmissions. An exemplary method generally includes receiving, from a base station, a plurality of downlink channel transmissions, wherein each of the downlink channel transmissions is sent using a first transmission time interval (TTI)
(Continued)

that is reduced relative to a legacy TTI and providing, in a single uplink channel transmission sent using a second TTI that is larger than the first TTI, a group acknowledgement indicating whether or not the downlink channel transmissions were successfully received by a UE.

32 Claims, 11 Drawing Sheets

Related U.S. Application Data

(60) Provisional application No. 62/108,019, filed on Jan. 26, 2015.

(51) Int. Cl.
*H04L 1/16* (2006.01)
*H04L 1/18* (2006.01)

(58) Field of Classification Search
USPC .......................................................... 370/336
See application file for complete search history.

(56) References Cited

U.S. PATENT DOCUMENTS

| 2011/0032925 | A1* | 2/2011 | Lee ...................... H04L 1/1621 |
| | | | 370/345 |
| 2013/0176950 | A1* | 7/2013 | Hakola ................. H04W 76/14 |
| | | | 370/329 |
| 2014/0098761 | A1* | 4/2014 | Lee ..................... H04W 74/006 |
| | | | 370/329 |
| 2016/0192388 | A1* | 6/2016 | Ekpenyong ....... H04W 72/1284 |
| | | | 370/329 |

FOREIGN PATENT DOCUMENTS

| CN | 101431950 A | 5/2009 |
| CN | 101507324 A | 8/2009 |
| CN | 101953106 A | 1/2011 |
| EP | 2717531 A2 | 4/2014 |
| JP | 2007336494 A | 12/2007 |
| JP | 2017533620 A | 11/2017 |
| WO | WO-2006105005 A2 | 10/2006 |
| WO | 2008030798 A2 | 3/2008 |
| WO | WO-2013112703 A2 | 8/2013 |
| WO | WO-2016040290 A1 | 3/2016 |

OTHER PUBLICATIONS

International Search Report and Written Opinion—PCT/US2016/014810—ISA/EPO—dated Apr. 19, 2016.
"Study on Latency reduction techniques for 1,3,20, LTE," 22,39, 3GPP Draft; RP-141375 Study on Latency 41,47, Reduction Techniques,—3rd Generation 49,55, Partnership Project (3GPP), Mobile 57,69, Competence Centre ; 650, Route Des 71,77, Lucioles ; F-06921 Sophia-Antipolis Cedex 79,85,87; France 9 2 Sep. 2014 (Sep. 2, 2014), XP050783718, Retrieved from the Internet: URL:http://www.3gpp.org/ftp/Meetings_3GPP_SYNC/RAN/Docs/ [retrieved on Sep. 2, 2014].

* cited by examiner

LOW LATENCY GROUP ACKNOWLEDGEMENTS

CLAIM OF PRIORITY UNDER 35 U.S.C. § 119

This application is a continuation of U.S. patent application Ser. No. 15/005,289, filed Jan. 25, 2016, which claims benefit of U.S. Provisional Patent Application Ser. No. 62/108,019, filed Jan. 26, 2015, both of which are herein incorporated by reference in their entirety.

FIELD

The present disclosure relates generally to communication systems, and more particularly, to quick uplink channels that enable a reduced transmission time interval (TTI) for low latency communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing legacy LTE, an eNodeB may receive data from a plurality of UEs over a shared uplink channel called the Physical Uplink Shared Channel (PUSCH). In addition, control information associated with the PUSCH may be transmitted to the eNodeB by the UE via a Physical Uplink Control Channel (PUCCH) and/or an Enhanced PUCCH (ePUCCH).

SUMMARY

Aspects of the present disclosure provide mechanisms for quick uplink channels that enable a reduced transmission time interval (TTI) for low latency communications.

Certain aspects of the present disclosure provide a method for wireless communications by a user equipment (UE). The method generally includes receiving, from a base station, a plurality of downlink channel transmissions, wherein each of the downlink channel transmissions is sent using a first transmission time interval (TTI) that is reduced relative to a legacy TTI and providing, in a single uplink channel transmission sent using a second TTI that is larger than the first TTI, a group acknowledgement indicating whether or not the downlink channel transmissions were successfully received by the UE.

Certain aspects of the present disclosure provide a method for wireless communications by a base station (BS). The method generally includes sending, to a user equipment (UE), a plurality of downlink channel transmissions, wherein each of the downlink channel transmissions is sent using a first transmission time interval (TTI) that is reduced relative to a legacy TTI and receiving, in a single uplink channel transmission sent using a second TTI that is larger than the first TTI, a group acknowledgement indicating whether or not the downlink channel transmissions were successfully received by the UE.

Certain aspects of the present disclosure provide an apparatus for wireless communications. The apparatus generally includes at least one processor configured to receive, from a base station, a plurality of downlink channel transmissions, wherein each of the downlink channel transmissions is sent using a first transmission time interval (TTI) that is reduced relative to a legacy TTI and to provide, in a single uplink channel transmission sent using a second TTI that is larger than the first TTI, a group acknowledgement indicating whether or not the downlink channel transmissions were successfully received by the UE, and a memory coupled with the at least one processor.

Certain aspects of the present disclosure provide an apparatus for wireless communications. The apparatus generally includes at least one processor configured to send, to a user equipment (UE), a plurality of downlink channel transmissions, wherein each of the downlink channel transmissions is sent using a first transmission time interval (TTI) that is reduced relative to a legacy TTI and to receive, in a single uplink channel transmission sent using a second TTI that is larger than the first TTI, a group acknowledgement indicating whether or not the downlink channel transmissions were successfully received by the UE, and a memory coupled with the at least one processor.

Certain aspects of the present disclosure provide an apparatus for wireless communications. The apparatus generally includes means for receiving, from a base station, a plurality of downlink channel transmissions, wherein each of the downlink channel transmissions is sent using a first transmission time interval (TTI) that is reduced relative to a legacy TTI, and means for providing, in a single uplink channel transmission sent using a second TTI that is larger than the first TTI, a group acknowledgement indicating whether or not the downlink channel transmissions were successfully received by the UE.

Certain aspects of the present disclosure provide an apparatus for wireless communications. The apparatus generally includes means for sending, to a user equipment (UE), a plurality of downlink channel transmissions, wherein each of the downlink channel transmissions is sent using a first transmission time interval (TTI) that is reduced relative to a legacy TTI, and means for receiving, in a single uplink channel transmission sent using a second TTI that is larger than the first TTI, a group acknowledgement indicating whether or not the downlink channel transmissions were successfully received by the UE.

Certain aspects of the present disclosure provide a computer-readable medium for wireless communications. The computer-readable medium generally includes code for receiving, from a base station, a plurality of downlink channel transmissions, wherein each of the downlink channel transmissions is sent using a first transmission time interval (TTI) that is reduced relative to a legacy TTI and providing, in a single uplink channel transmission sent using a second TTI that is larger than the first TTI, a group acknowledgement indicating whether or not the downlink channel transmissions were successfully received by the UE.

Certain aspects of the present disclosure provide a computer-readable medium for wireless communications. The computer-readable medium generally includes code for sending, to a user equipment (UE), a plurality of downlink channel transmissions, wherein each of the downlink channel transmissions is sent using a first transmission time interval (TTI) that is reduced relative to a legacy TTI and receiving, in a single uplink channel transmission sent using a second TTI that is larger than the first TTI, a group acknowledgement indicating whether or not the downlink channel transmissions were successfully received by the UE.

Certain aspects provide various methods, apparatuses, computer-readable medium, and computer program products for performing the operations described herein.

DETAILED DESCRIPTION

Figure 1:
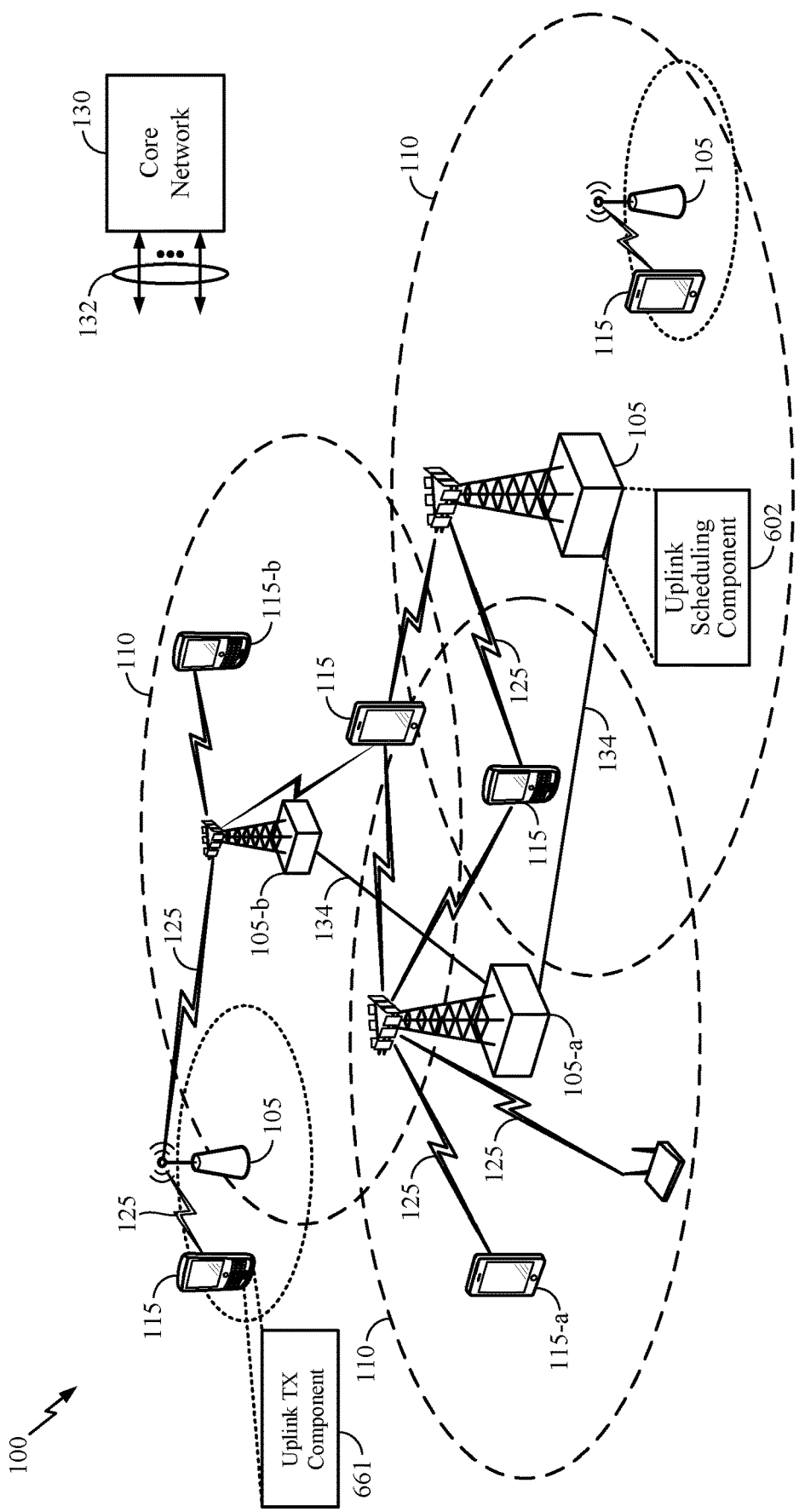
FIG. 1 shows a block diagram conceptually illustrating an example of a telecommunications system, in accordance with an aspect of the present disclosure.

A conventional transmission time interval (TTI) for uplink and downlink channels in a wireless communications system, such as LTE, is a subframe duration. In some cases, low latency "quick" channels may be used that have a reduced TTI relative to the legacy subframe duration TTI, in an effort to help reduce latency in a wireless communications system (e.g., allowing for reduced processing and response times). For example, "quick" downlink channels (with a reduced TTI of 1 or 2 symbol durations) may be used. In some cases, the downlink channel transmissions may, in turn, be acknowledged with quick uplink channel transmissions (also having a reduced TTI).

However, such low latency uplink and downlink control channels may not be optimal in all conditions. For example, poor channel conditions may result in an undesirable amount of rapid retransmissions, which may counteract some of the gains achieved by using the quick channel transmissions in the first place.

Thus, aspects of the present disclosure provide techniques for group acknowledgement of downlink channel transmissions (e.g., downlink channels having a reduced TTI as compared to a legacy TTI), for example, using an uplink transmission having a greater TTI than the "quick" downlink channels.

Moreover, certain aspects of the present disclosure additionally implement frame scheduling of legacy channels (e.g., PDCCH, EPDCCH, PDSCH) alongside the Quick channel (e.g., QPUCCH, QEPUCCH, QPUSCH). The methods and apparatus described herein may be implemented for applications that are configured to utilize Quick channel scheduling and/or legacy scheduling. As the Quick LTE scheduling methods described herein may utilize a 0.5 ms (1 time slot) or less TTI. rather than the 1 ms TTI of legacy, these methods may increase communication rates and may cut a round-trip time (RTT) associated with legacy LTE hybrid automatic repeat request (HARQ) procedures in half (e.g., from 8 ms to 4 ms or less).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Referring first to FIG. 1, a diagram illustrates an example of a wireless communications system 100, in which aspects of the present disclosure may be practiced, for example, for providing a group acknowledgement of downlink channel transmissions having a reduced TTI with respect to a legacy TTI.

The wireless communications system 100 includes a plurality of access points (e.g., base stations, eNBs, or WLAN access points) 105, a number of user equipment (UEs) 115, and a core network 130. Access points 105 may include an uplink scheduling component 602 configured to expedite communication of control information and user data with the number of UEs 115 using a Quick LTE channel which may include a TTI of one slot for some RE blocks. Similarly, one or more of UEs 115 may include an uplink transmitter component 661 configured to transmit and operate using Quick LTE channel structure. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-*a* may communicate with access point 105-*a* on both a first hierarchical layer that supports first layer transmissions with a first subframe type and a second hierarchical layer that supports second layer transmissions with a second subframe type. For example, access point 105-*a* may transmit subframes of the second subframe type that are time division duplexed with subframes of the first subframe type.

In some examples, an access point 105-*a* may acknowledge receipt of a transmission by providing ACK/NACK for the transmission through, for example, a HARQ scheme. Acknowledgments from the access point 105-*a* for transmissions in the first hierarchical layer may be provided, in some examples, after a predefined number of subframes following the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Thus, second layer UE 115-*b* may operate with reduced latency compared to UEs 115 that operate on the first hierarchical layer.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a netbook, a smart book, an ultrabook, a cordless phone, a wearable item such as a wrist band, a watch, glasses, a ring, a bracelet, clothing, virtual reality headset, etc., a heads-up display, a wireless local loop (WLL) station, a camera, a drone, a robot/robotic device, a dashboard, a navigation system, an entertainment device (e.g., music device, gaming device), healthcare/medical devices, vehicular devices, etc. Some UEs may be considered machine-type communication (MTC) UEs, which may include remote devices, that may communicate with a base station, another remote device, or some other entity. MTC may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC UEs include sensors, meters, monitors, location tags, drones, trackers, robots/robotic devices, etc. MTC UEs as well as other types of UEs may be implemented as NB-IoT (narrowband internet of things) devices. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation (CA) to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined with other techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
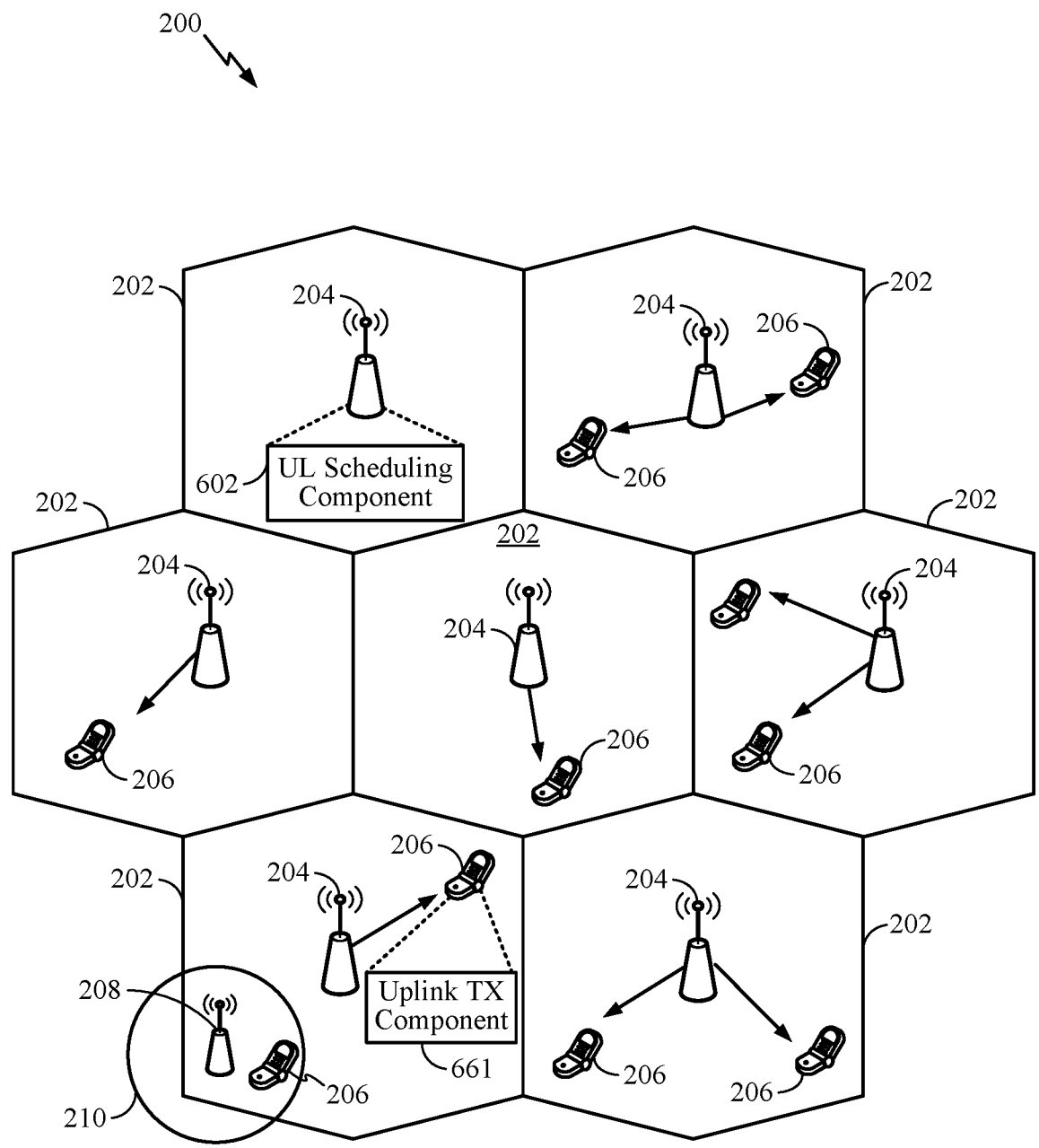
FIG. 2 is a diagram illustrating an example of an access network.

FIG. 2 is a diagram illustrating an example of an access network 200 in an LTE network architecture, in which aspects of the present disclosure may be practiced, for example, for providing a group acknowledgement of downlink channel transmissions having a reduced TTI with respect to a legacy TTI.

In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the evolved packet core (EPC) for all the UEs 206 in the cells 202. In an aspect, eNBs 204 may include an uplink scheduling component 602 configured to expedite communication of control information and user data with the number of UEs 115 using an Quick LTE data structure, for example but not limited to the data structure 1000 of FIG. 10, which may include a TTI of one slot for some RE blocks. Similarly, one or more of UEs 206 may include an uplink transmitter component 661 configured to transmit, decode and operate using the data structure. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
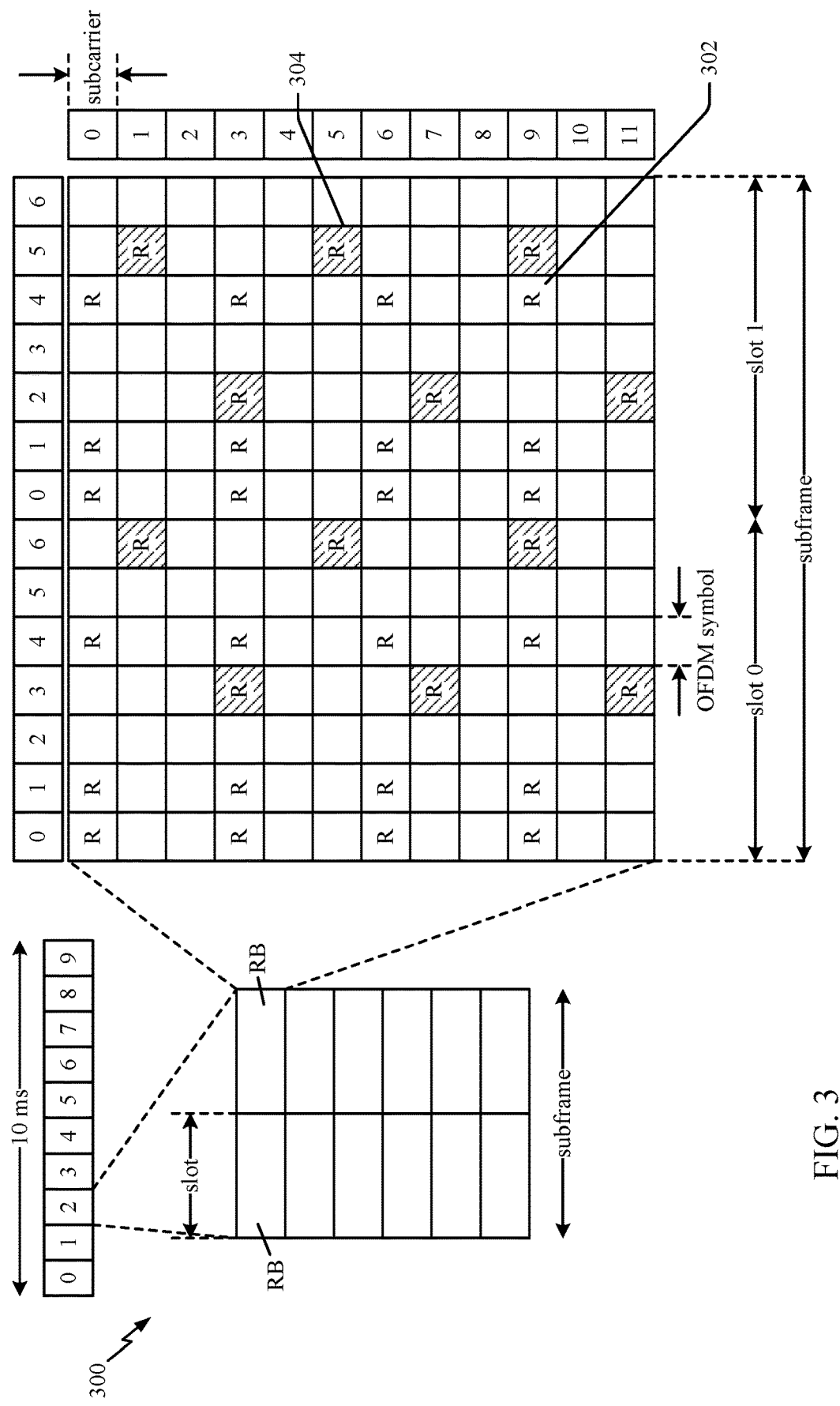
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding PDSCH is mapped. The number of bits carried by each resource element depends on the modulation scheme. Thus, the more resource element blocks that a UE receives and the higher the modulation scheme, the higher the data rate for the UE.

Figure 4:
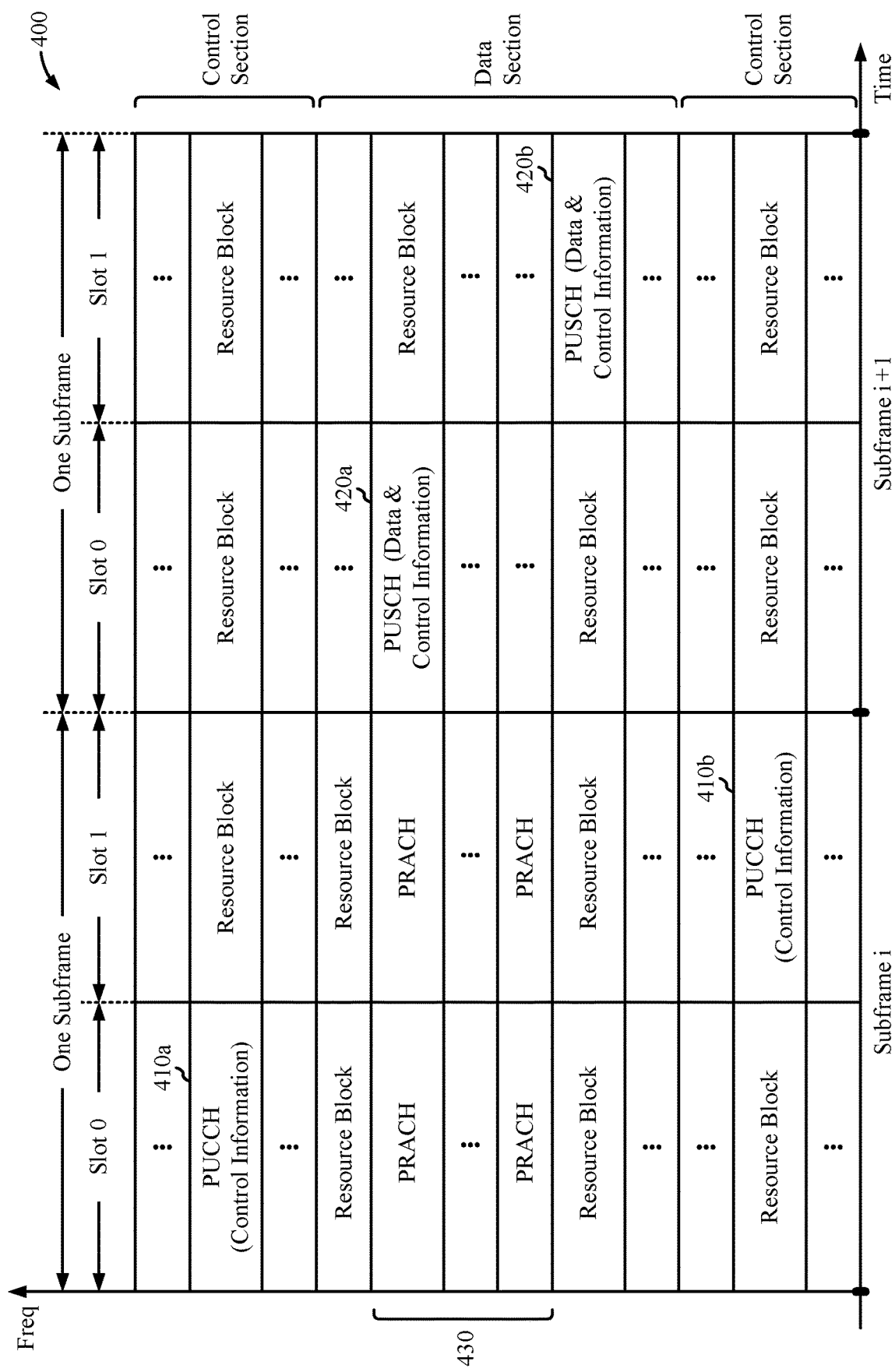
FIG. 4 is a diagram illustrating an example of an UL frame structure in LTE.

FIG. 4 is a diagram 400 illustrating an example of an UL frame structure in LTE. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. A UL transmission may span both slots of a subframe and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
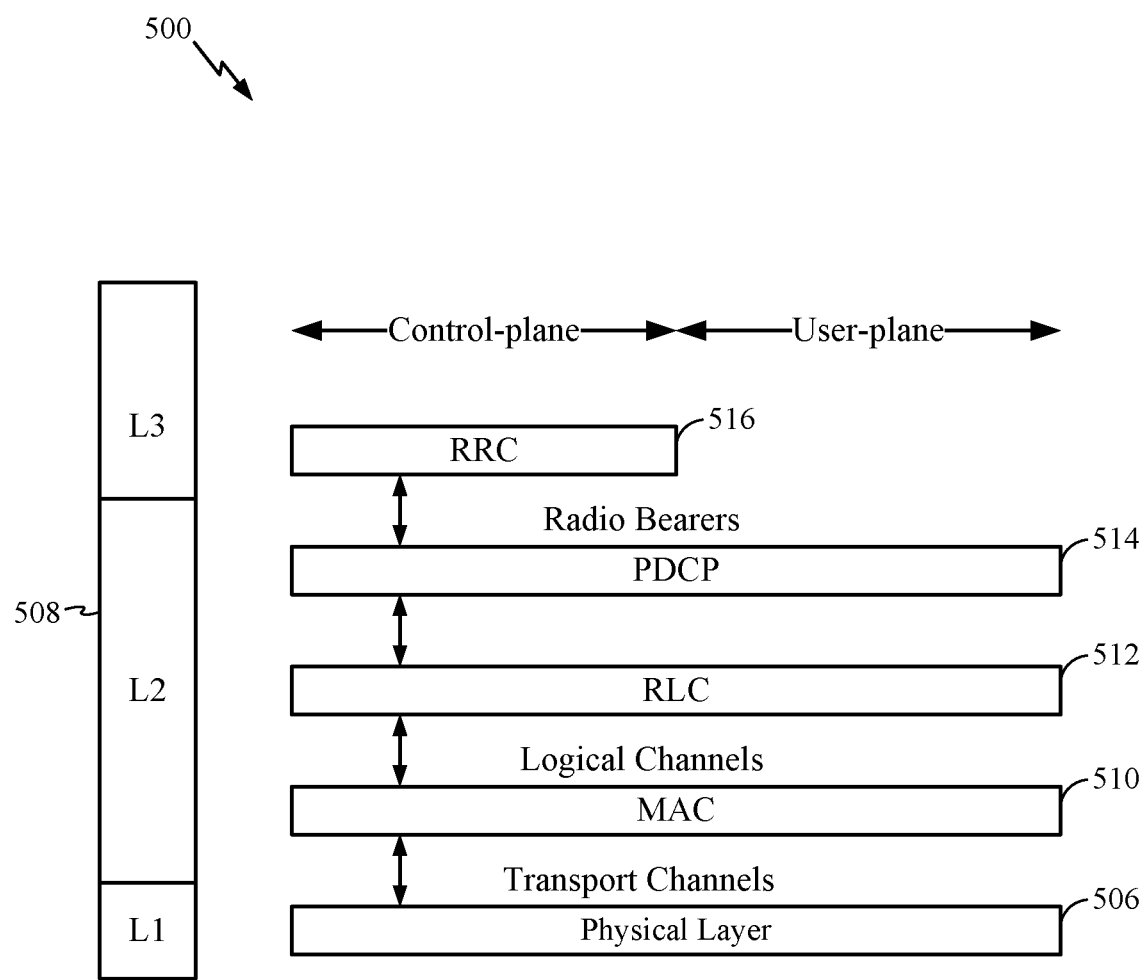
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
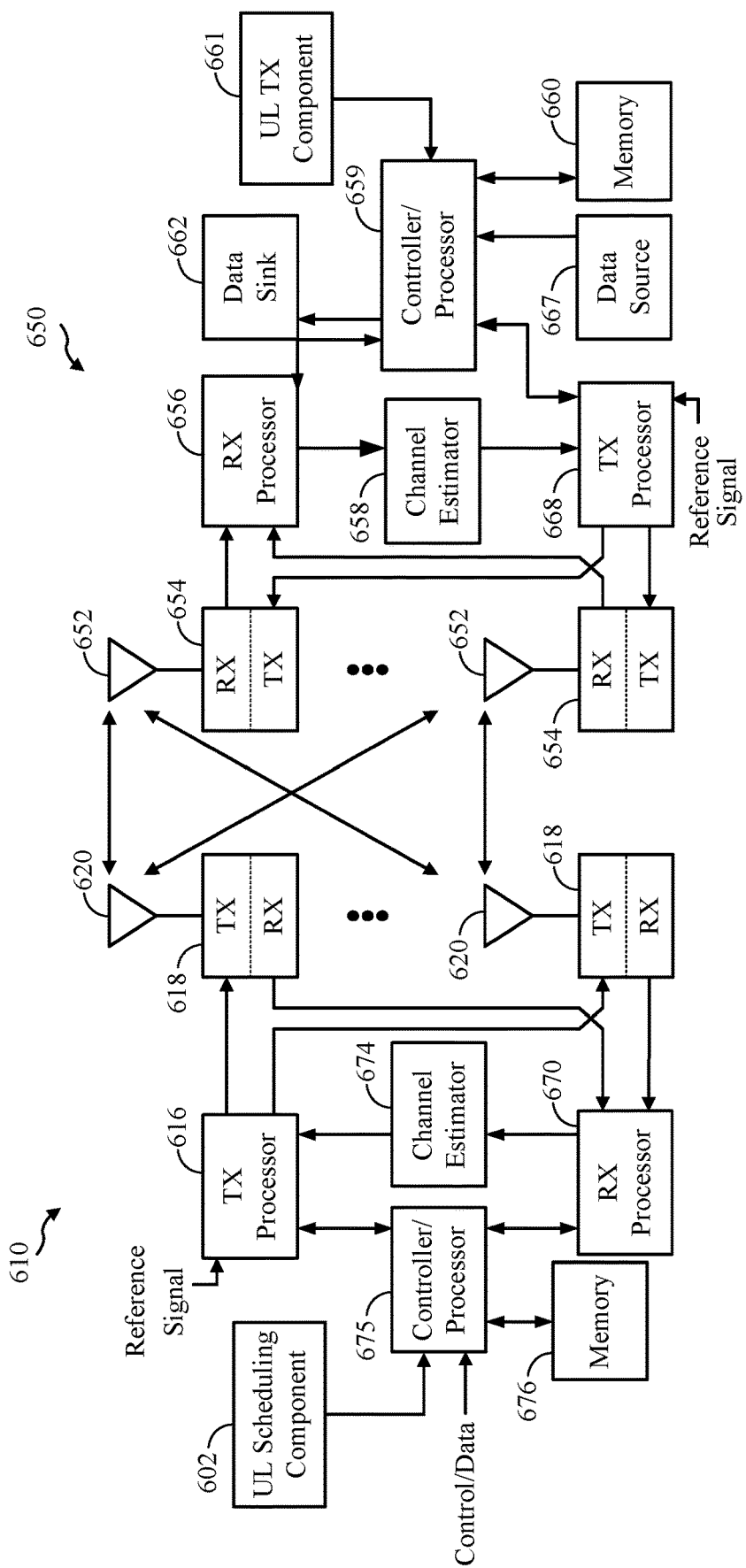
FIG. 6 is a diagram illustrating an example of an evolved Node B and user equipment in an access network.

FIG. 6 is a block diagram of an eNB 610 in communication with a UE 650 in an access network, in which aspects of the present disclosure may be practiced, for example, for providing a group acknowledgement of downlink channel transmissions having a reduced TTI with respect to a legacy TTI.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. The controller/processor 675 can direct/carry out various operations of eNB 610 (e.g., operations illustrated in association with FIG. 9).

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. In addition, eNB 610 may include an uplink scheduling component 602 configured to expedite communication of control information and user data with the number of UEs 650 according to aspects of the present disclosure.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. The controller/processor 659 can direct/carry out various operations of UE 650 (e.g., operations illustrated in association with FIG. 8). In addition, UE 650 may include an uplink transmitter component 661 configured to receive, decode and operate using the data structure of aspects of the present disclosure.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Low latency communications may be enabled by the use of reduced transmission time intervals (TTIs) relative to legacy TTIs. For example, in some cases, a TTI of 0.5 ms or lower may be used for a low latency (LL) channel based on a physical downlink control channel (PDCCH), enhanced PDCCH (ePDCCH), PDSCH, PUCCH, and PUSCH based on time slots rather than subframes (e.g., with an LTE subframe including 2 time slots of 0.5 ms each), or even symbol periods.

In some cases, low latency (or ultra-low latency (ULL)) systems may target certain level of performance relative to existing systems. For example, such systems may target a reduction in over-the-air latency of up to ten times (10×), such as a reduction from 4 ms latency to 300 us or less.

In some cases, it may be desirable to reuse an existing mechanism, such as LTE numerology to allow for minimal specification and implementation impact, as well as backward compatibility. For example, low latency systems may maintain the same 15 kHz tone spacing and symbol duration (~71 μs for normal cyclic prefix or ~83 μs for extended cyclic prefix) as a legacy system. This may allow for smooth integration of LL UEs and legacy 1 ms based LTE UEs. For example, LL UEs and legacy 1 ms-based UEs may co-exist in the same subframe via RB-level multiplexing.

Figure 7:
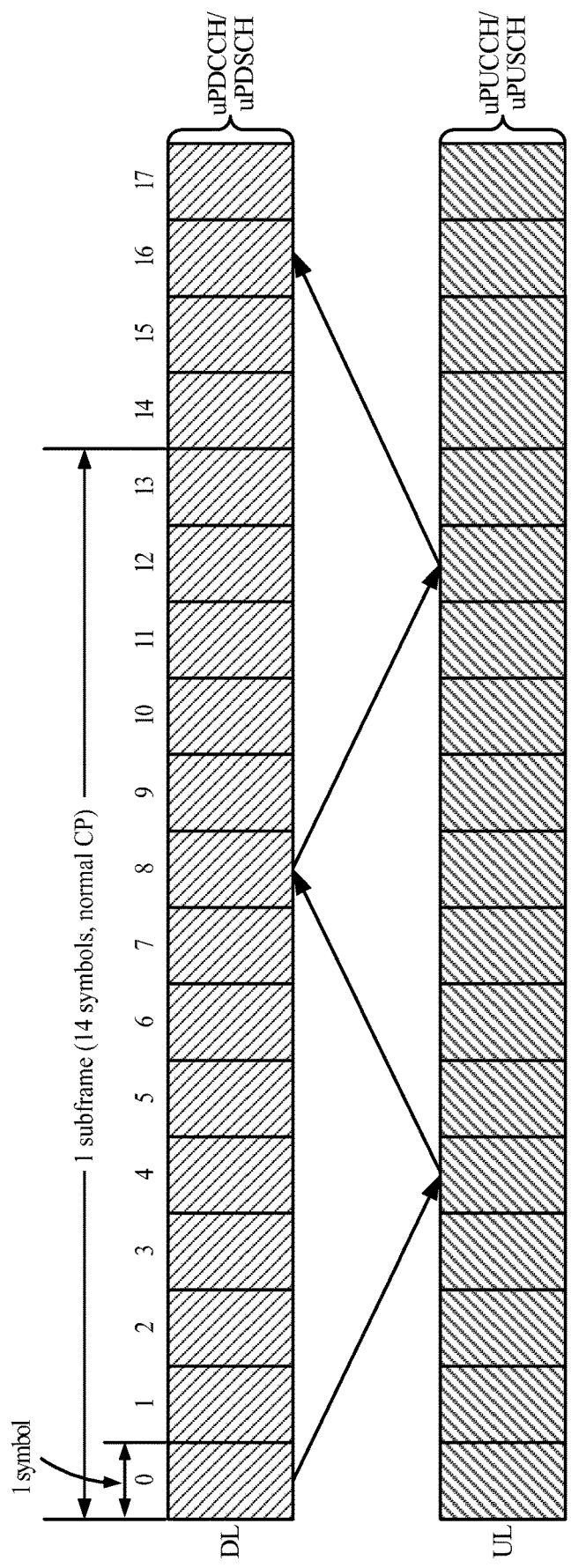
FIG. 7 illustrates example low latency transmissions, in accordance with aspects of the present disclosure.

FIG. 7 illustrates an example of such system, in which a low latency transmission TTI may be one symbol in duration. For normal CP, this TTI value (~71 μs) represents a 14-times latency reduction in HARQ turnaround time, as compared to the legacy systems. In other words, an ultra-low latency downlink transmission (e.g., labeled uPDCCH or uPDSCH) may be acknowledged 4 symbols later, via an ultra-low latency uplink transmission (e.g., labeled uPUCCH or uPUSCH), and re-transmitted if necessary 4 symbols after that (resulting in an ~300 μs HARQ latency compared to 4 ms HARQ latency of current LTE). For example, as illustrated an eNB may perform a downlink transmission in symbol 0, which may be acknowledged by a UE in symbol 4. Then, if necessary, the downlink transmission may be retransmitted in symbol 8. For extended CP, this TTI value (~83 μs) may still represent a 12-times latency reduction in HARQ turnaround time, as compared to the legacy systems.

In some cases, using a shorter TTI such as one-symbol or two-symbol uplink channel transmission to acknowledge downlink transmissions (e.g., quick downlink transmissions) may not be possible or may be very challenging for UEs under unfavorable channel conditions. This is because these UEs may be subject to uplink link budget limitations. For example, a shorter TTI makes it more difficult to convey a certain payload size without experiencing power limitation conditions.

One possible way to resolve this issue may be to use a longer TTI for uplink control information (UCI) transmissions and acknowledge low latency downlink transmissions in a group acknowledgement, which may be suitable in many cases. This can also effectively increase the range of DL ULL communications when UL HARQ acknowledgment is needed. That is, if UL HARQ acknowledgment is necessary for DL ULL communications, a UE may still provide the corresponding HARQ feedback with a longer TTI when a shorter TTI is not possible or when it is inefficient to carry the corresponding HARQ feedback without experiencing power limitation conditions.

For example, if HARQ termination target is relatively low (e.g., targeting 99% after first transmission), the need for HARQ is not that strong. In such cases, only about 1% of packets may need re-transmissions. Considering consecutive ULL transmissions for a UE in one slot or a subframe, the probability of re-transmission may be (1−0.99^7)=6.8% (7 symbols per slot), or (1−0.99^14)=13.1% (14 symbols per subframe), assuming independent error probability. If the number of ULL transmissions is not consecutive, the probability of re-transmission may be even smaller. If the block error probability is correlated, the probability of re-transmission can be smaller (e.g., assuming 100% correlation), the probability of having one error in the ULL transmissions of a slot or a subframe is 1%.

Thus, aspects of the present disclosure provide techniques for providing a group acknowledgement for multiple downlink transmissions sent using a reduced TTI (e.g., 1 or 2 symbols in duration) in a single uplink transmission sent using a larger TTI (e.g., a time slot or subframe duration).

Figure 8:
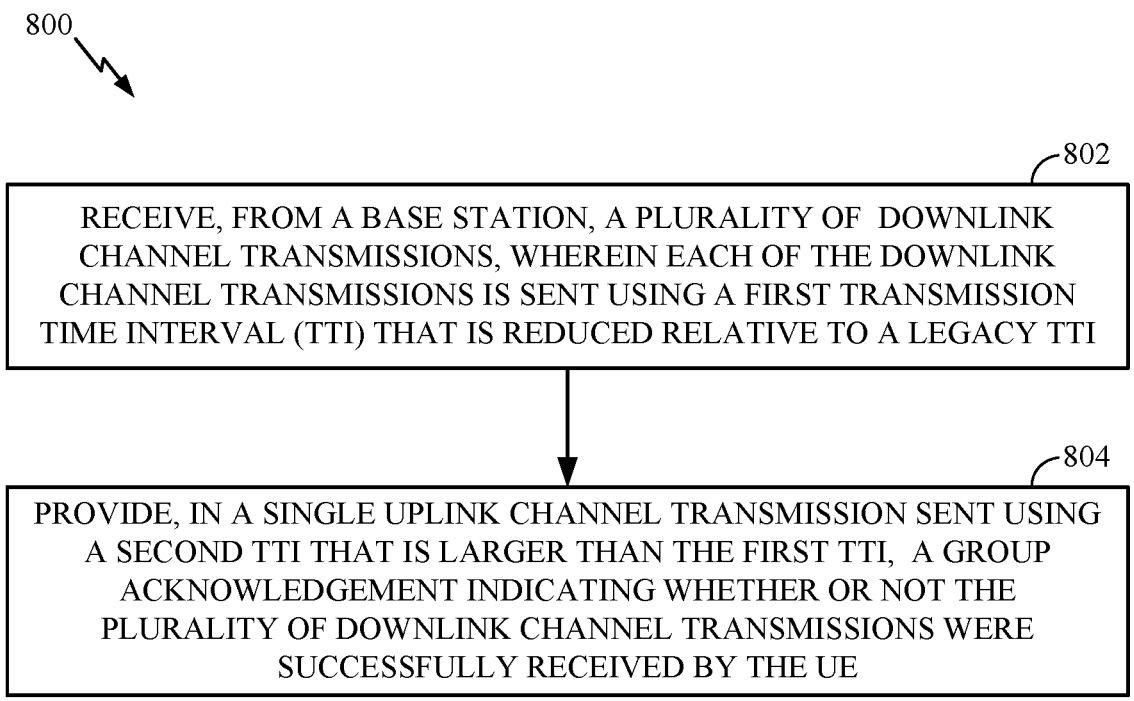
FIG. 8 illustrates example operations for wireless communications by a user equipment (UE), in accordance with aspects of the present disclosure.

FIG. 8 illustrates example operations 800 for low latency wireless communications, in accordance with aspects of the present disclosure. The operations 800 may be performed, for example, by a user equipment (UE) capable of supporting reduced TTIs (e.g., one or more of the UEs 115, 206, or 650).

The operations 800 begin, at 802, by receiving, from a base station, a plurality of downlink channel transmissions, wherein each of the downlink channel transmissions is sent using a first transmission time interval (TTI) that is reduced relative to a legacy TTI. At 804, the UE provides, in a single uplink channel transmission sent using a second TTI that is larger than the first TTI, a group acknowledgement indicating whether or not the downlink channel transmissions were successfully received by the UE.

Figure 9:
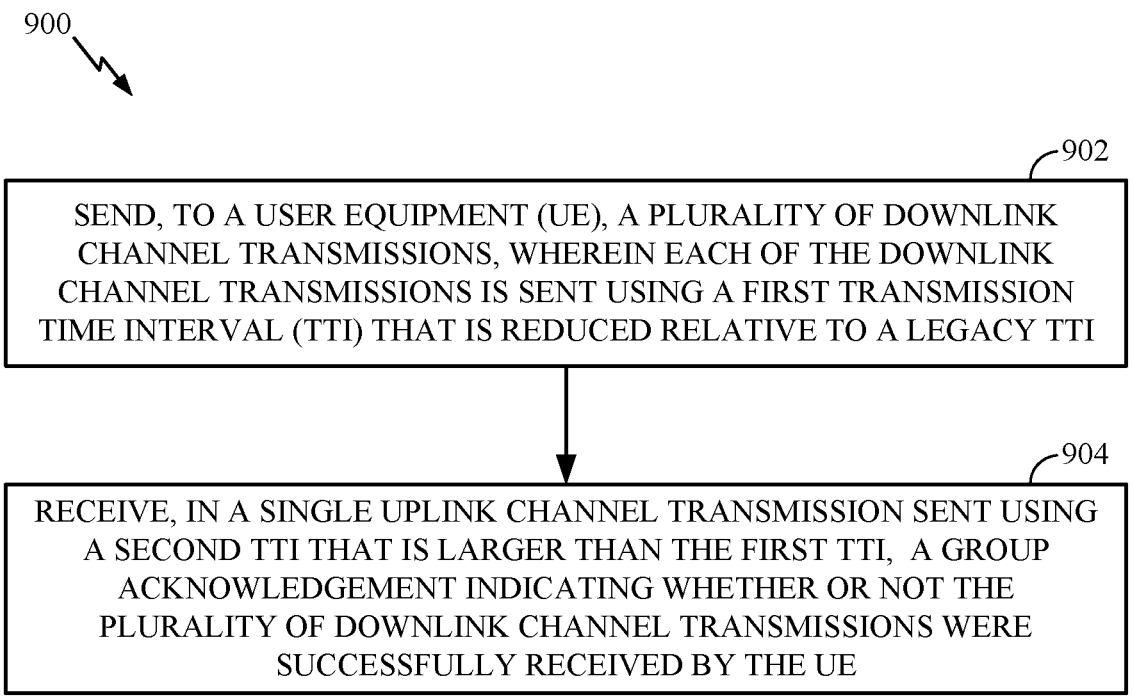
FIG. 9 illustrates example operations for wireless communications by a base station (BS), in accordance with aspects of the present disclosure.

FIG. 9 illustrates example operations 900 for low latency wireless communications, in accordance with aspects of the present disclosure. The operations 900 may be performed, for example, by a base station (e.g., one or more of eNBs 105, 204 or 610) capable of supporting reduced TTIs-and transmitting to a UE performing operations 800 shown in FIG. 8.

The operations 900 begin, at 902, by sending, to a user equipment (UE), a plurality of downlink channel transmissions, wherein each of the downlink channel transmissions is sent using a first transmission time interval (TTI) that is reduced relative to a legacy TTI. At 904, the base station receives, in a single uplink channel transmission sent using a second TTI that is larger than the first TTI, a group acknowledgement indicating whether or not the downlink channel transmissions were successfully received by the UE.

According to certain aspects, the acknowledgements referenced in the above operations may correspond to a hybrid automatic repeat request (HARQ) process for acknowledging downlink low latency transmissions. Further, according to certain aspects, a one-slot or one-subframe based physical uplink control channel (PUCCH) may be used to handle HARQ for a plurality of downlink low latency transmissions.

In some cases, based on certain conditions (e.g., channel conditions) a UE may be configured to use either the non-LL PUCCH or the LL uPUCCH. For example, for UEs in bad channel conditions, a one-subframe-based PUCCH may be used to provide HARQ feedback for DL LL transmissions; for UEs in good channel conditions, a one-symbol- or two-symbol-based uPUCCH (e.g., the TTI equals one symbol or two symbols) can be used to provide HARQ feedback for DL LL transmissions. According, to certain aspects, the channel conditions may be determined based on a measurement report from the UE (e.g., an RSRP measurement or a CSI (channel state information) report) and the base station may configure the UE whether or not to use group acknowledgements, "quick" uplink channels for acknowledgements, or both.

According to certain aspects, each group acknowledgement sent in a PUCCH transmission (e.g., having a time slot- or subframe-based TTI) may be used to handle multiple DL LL transmissions (having a 1 or 2 symbol TTI). An eNB receiving the group ACK may use the group ACK to perform "quick" re-transmissions (quicker than RRC based re-transmissions).

Figure 10:
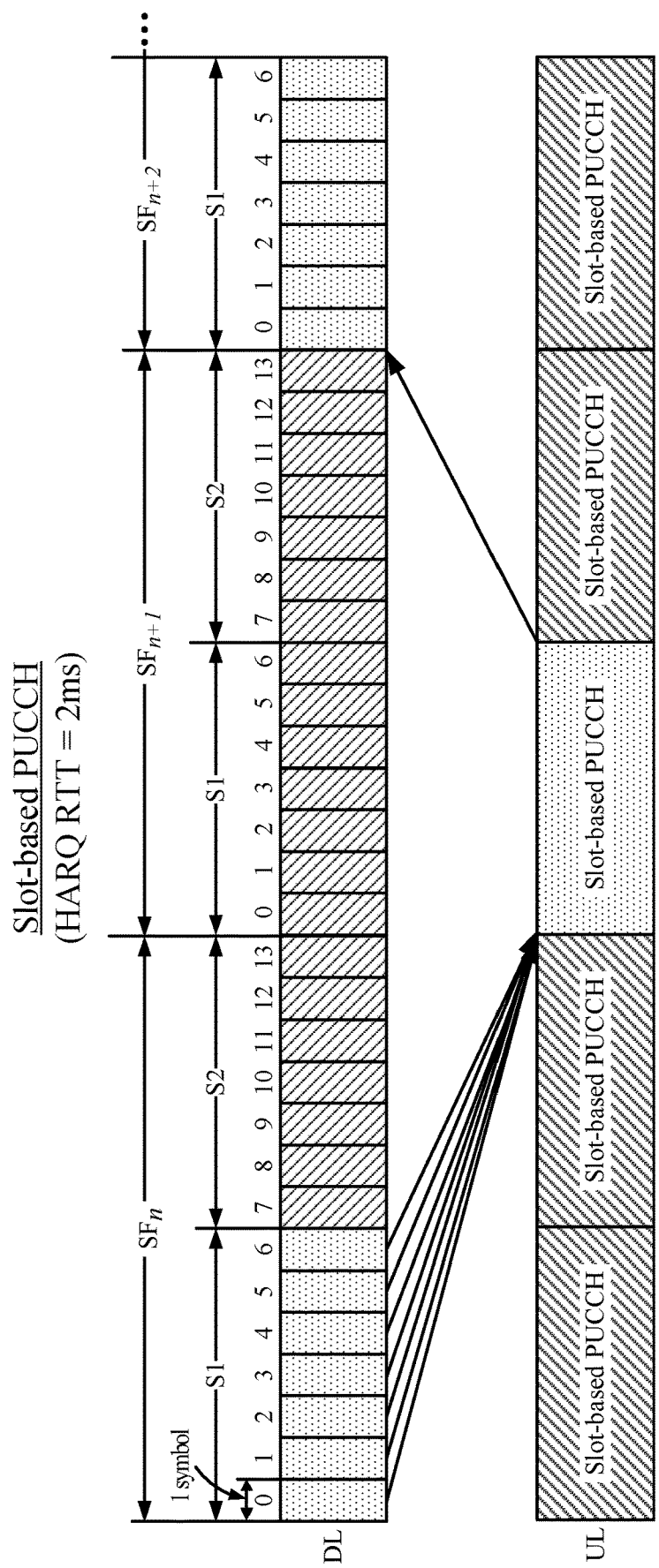
FIG. 10 illustrates a slot-based approach for group acknowledgements, in accordance with certain aspects of the present disclosure.

FIG. 10 illustrates a slot-based approach to PUCCH HARQ transmissions (using a 1-slot TTI), in accordance with certain aspects of the present disclosure. As illustrated, on the DL, an eNB may send a plurality of LL transmissions during the first slot (e.g., symbols 0-6) of subframe $SF_n$ using a one-symbol TTI. A UE may receive the plurality of DL LL transmissions and may transmit a group acknowledgement in an uplink transmission (e.g., PUCCH), for example, in the first slot, S1, of subframe $SF_{n+1}$ using a one-slot TTI. The eNB may receive the group acknowledgement and may decide to retransmit the DL LL transmissions (which may be received by the UE) in the first slot, S1, of subframe $SF_{n+2}$, for example, based on a negative acknowledgement in the group acknowledgement. Thus, the illustrated slot-based PUCCH may result in a 2 ms HARQ RTT (versus ~570 μs).

Figure 11:
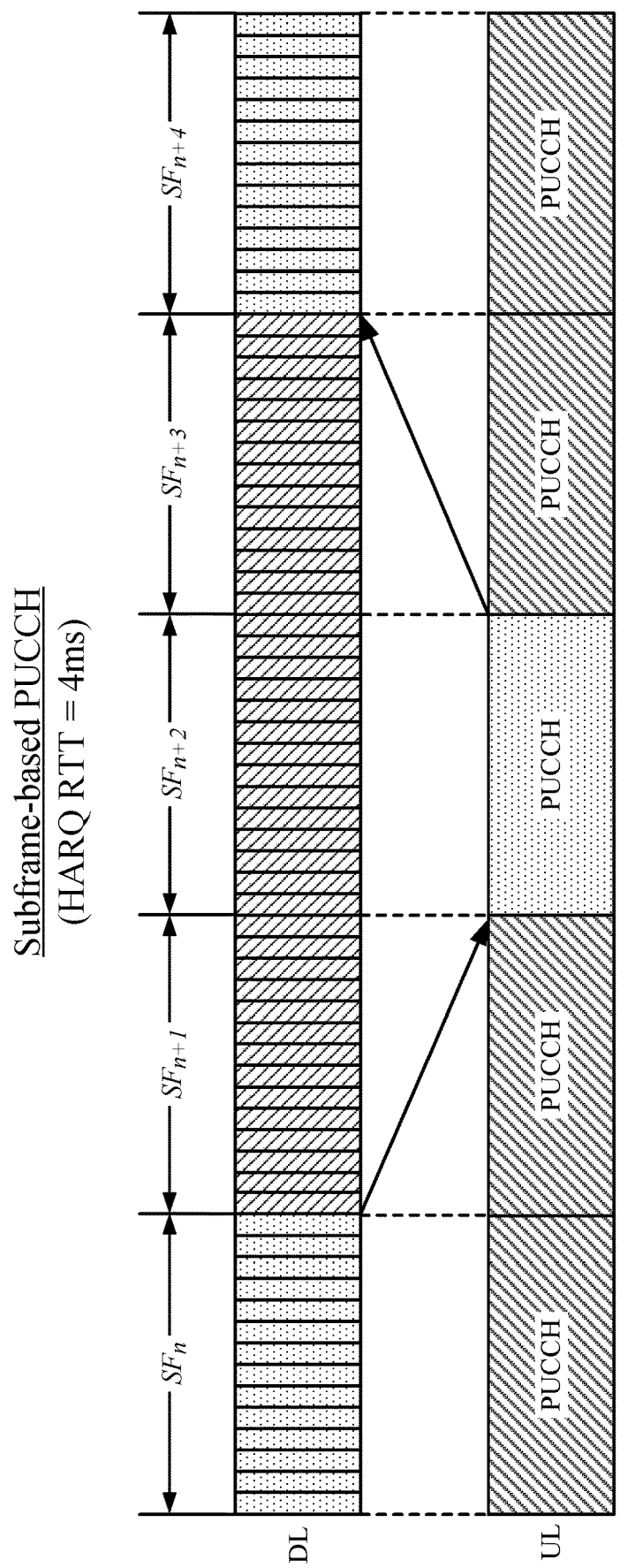
FIG. 11 illustrates a subframe-based approach for group acknowledgements, in accordance with certain aspects of the present disclosure.

FIG. 11 illustrates a subframe-based approach to PUCCH HARQ transmissions, in accordance with certain aspects of the present disclosure. For example, on the DL, an eNB may make a plurality of LL transmissions on the QPDCCH or QPDSCH during subframe $SF_n$, for example, using a one-symbol TTI. A UE may receive the plurality of DL LL transmissions and may transmit a group acknowledgement in subframe $SF_{n+2}$ using a one-subframe TTI. The eNB may receive the group acknowledgement and may decide to retransmit the LL transmissions in subframe $SF_{n+4}$. As illustrated, this subframe-based PUCCH may result in a 4 ms HARQ RTT.

Figure 12:
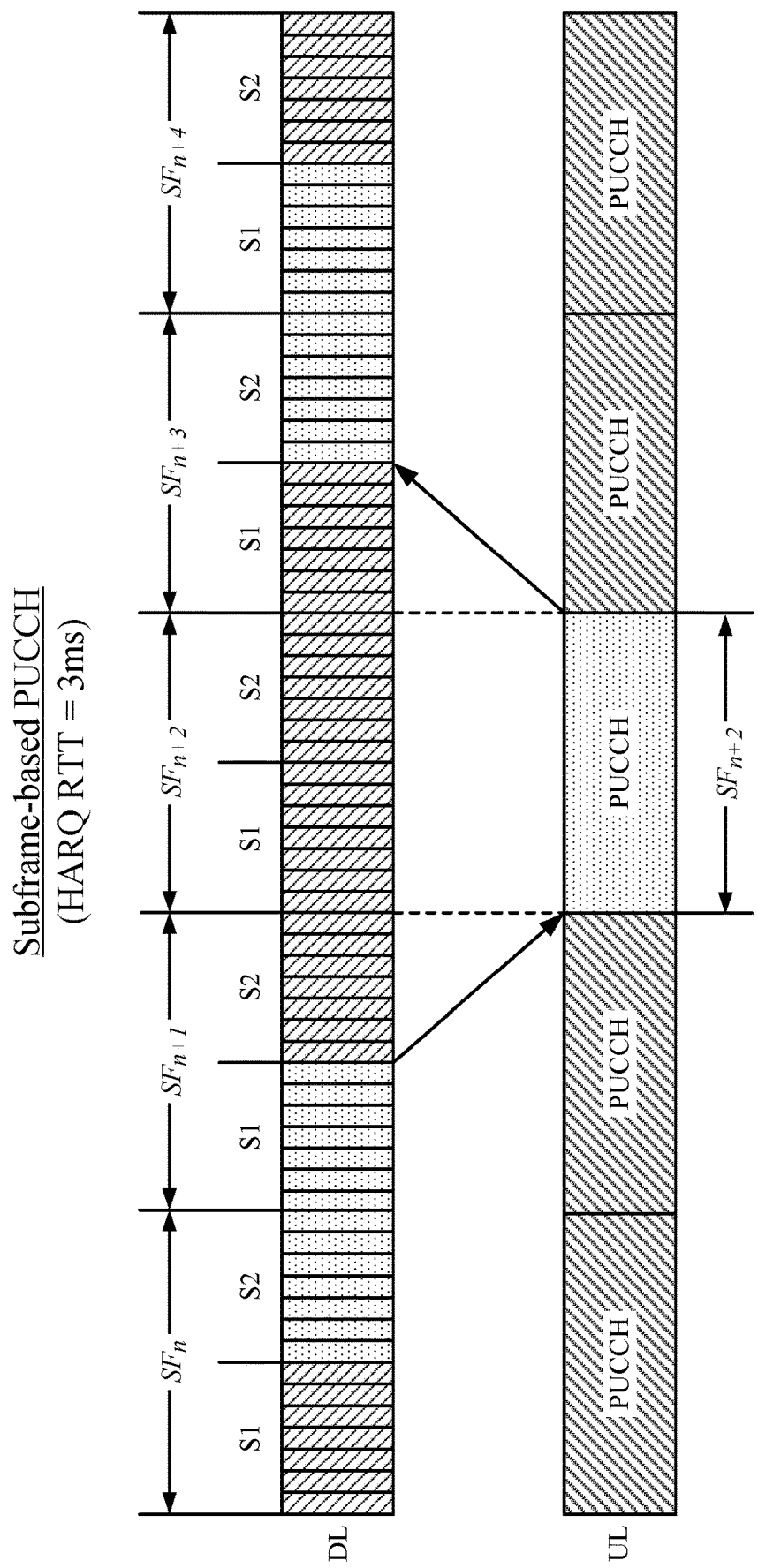
FIG. 12 illustrates another subframe-based approach for group acknowledgements, in accordance with certain aspects of the present disclosure.

FIG. 12 illustrates another subframe-based approach that may be considered a hybrid approach, in accordance with certain aspects of the present disclosure. As illustrated, on the DL, an eNB may make a plurality of LL transmissions during slot S2 of subframe $SF_n$ and slot S1 of subframe $SF_{n+1}$ using a one-symbol TTI. A UE may receive the plurality of DL LL transmissions and may transmit a group acknowledgement in subframe $SF_{n+2}$ using a one-subframe TTI. Similarly (while not shown), the UE may use a PUCCH in slot S2 of subframe $SF_{n+1}$ and slot S1 of subframe $SF_{n+2}$ to acknowledge DL LL transmissions sent in $SF_n$. As another example (while not shown), instead of a 0.5 ms offset, other offset values may also be possible. For example, an eNB may make a plurality of LL transmissions during the last 2 symbols of slot S1 and all symbols of slot S2 of subframe $SF_n$ and the first 2 symbols in slot S1 of subframe $SF_{n+1}$ using a one-symbol TTI. A UE may receive the plurality of DL LL transmissions and may transmit a group acknowledgement in subframe $SF_{n+2}$ using a one-subframe TTI. This will leave a longer duration for a UE to process DL LL transmissions before being ready to provide the corresponding HARQ feedback. In any case, as illustrated, the subframe-based PUCCH may result in a HARQ RTT that is less than 4 ms (e.g., 3 ms).

In an aspect, a plurality of LL transmissions may come from one or more DL carriers, while the corresponding PUCCH may come from a single uplink carrier. As an example, a UE may be configured with carrier aggregation or dual-connectivity operation, where a plurality of carriers may be aggregated. DL LL transmissions may be enabled in two or more of the plurality of carriers, while PUCCH is only enabled on one of the plurality of carriers. The PUCCH carrier may be a primary carrier or a primary second carrier.

In an aspect, enabling the use of a PUCCH or a uPUCCH for HARQ feedback for DL LL transmissions may be based on a semi-static signaling (e.g., a RRC configuration) or a dynamic signaling. As an example, an eNB may provide a UE with an indication in a downlink control channel of whether a PUCCH or a uPUCCH should be used for HARQ feedback for DL LL transmissions. That is, an eNB may provide the UE with an indication of whether to use a group acknowledgement (e.g., using the PUCCH) or an individual acknowledgement (e.g., using the uPUCCH) to acknowledge one or more downlink transmissions. In some cases, this acknowledgement may be based on based on a measurement report from the UE (e.g., an RSRP measurement or a CSI report), as explained above.

In an aspect, a number of HARQ processes for DL LL transmissions may be independent of whether a PUCCH or a uPUCCH is used for HARQ feedback for DL LL transmissions. Alternatively, a number of HARQ processes for DL LL transmissions may be dependent of whether a PUCCH or a uPUCCH is used for HARQ feedback for DL LL transmissions. As an example, a larger number of HARQ processes for DL LL transmissions may be determined (e.g., by a UE) if PUCCH (e.g., which may be used to carry a group acknowledgement) is used for HARQ feedback, compared to a number of HARQ processes for DL LL transmissions if a uPUCCH (e.g., which may be used to carry individual acknowledgements) is used for HARQ feedback.

In one aspect, a group acknowledgment for a plurality of DL LL transmissions may comprise HARQ feedback for one or more transmissions for a same HARQ process of DL LL transmissions. As an example, a total of 8 HARQ processes may be identified for DL LL transmissions on a carrier. A group acknowledgment may be comprised of 14 acknowledgments, corresponding to two transmissions for 6 HARQ processes and one transmission of the remaining two HARQ processes.

In one aspect, a UE may have a total soft buffer size. For a carrier, the total soft buffer size may be partitioned into a number of portions. As an example, the partitioning may be based on an assumption of 8 HARQ processes, and consequently, there may be 8 portions. Under group acknowledgment, a number of DL LL transmissions without in-time HARQ feedback may be significantly larger than the number of soft buffer portions. It can be up to the UE to implement how to store soft decoding bits of various HARQ processes and various transmissions of a same HARQ processes into the available portions of soft buffer. It may also be specified that the storing of soft decoding bits can be dependent on some parameters associated with each DL LL transmissions. As an example, a DL LL transmission earlier may have a lower priority. As another example, a DL LL transmission with a higher MCS may have a higher priority.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the Figures, those operations may be performed by any suitable corresponding counterpart means plus function components.

According to certain aspects, such means may be implemented by processing systems configured to perform the corresponding functions by implementing various algorithms (e.g., in hardware or by executing software instructions) described above.

For example, means for determining, means for providing, means for sending, means for (re)transmitting, and means for receiving may comprise one or more of a transmitter/receiver (e.g., the transceiver TX/RX 618, 654), an antenna(s) 620, 652, or one or more processors (e.g., RX Processor 656, 670, Controller/Processor 659, 675, and/or TX Processor 616, 668) of the eNB 610 or UE 650 illustrated in FIG. 6.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof. Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory, PCM (phase change memory), ROM memory, EPROM memory, EEPROM memory, registers, hard disk, a removable disk, a CD ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

As used herein, a phrase referring to "at least one of" a list of items refers to any combination of those items, including single members. As an example, "at least one of a, b, or c" is intended to cover a, b, c, a-b, a-c, b-c, a-b-c, and any combination of any number of a, b, or c.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communications by a user equipment (UE), comprising:
at least one processor; and
memory coupled to the at least one processor, the memory comprising instructions executable by the at least one processor to cause the UE to:
receive, from a base station, a plurality of downlink channel transmissions, wherein each of the downlink channel transmissions is sent using a first transmission time interval (TTI) that is reduced relative to a legacy TTI; and
provide, in a single uplink channel transmission sent using a second TTI that is larger than the first TTI, a group acknowledgement indicating whether or not the downlink channel transmissions were successfully received by the UE.

2. The apparatus of claim 1, wherein:
the legacy TTI has a duration corresponding to a subframe duration; and
the second TTI has a duration corresponding to a duration less than a subframe.

3. The apparatus of claim 1, wherein the first TTI has a duration corresponding to a symbol duration.

4. The apparatus of claim 1, wherein the group acknowledgement is used to acknowledge downlink channel transmissions sent in multiple time slots of one or more subframes.

5. The apparatus of claim 1, wherein the group acknowledgement is used to acknowledge downlink channel transmissions sent in a second time slot of a first subframe and a first time slot of a second subframe.

6. The apparatus of claim 1, the memory further comprising instructions executable by the at least one processor to cause the UE to receive an indication to use the group acknowledgment or an individual acknowledgement for a downlink channel transmission.

7. The apparatus of claim 6, wherein the indication is at least one of a semi-static signaling or a dynamic signaling.

8. The apparatus of claim 7, wherein the indication is based on at least one of a channel state information (CSI) or a reference signal receive power (RSRP) measurement.

9. The apparatus of claim 1, the memory further comprising instructions executable by the at least one processor to cause the UE to receive a retransmission of a downlink channel transmission that was negatively acknowledged in the group acknowledgement.

10. The apparatus of claim 1, wherein the second TTI is the same as the legacy TTI.

11. The apparatus of claim 1, wherein the downlink channel transmissions are transmitted on one or more carriers configured for the UE.

12. The apparatus of claim 1, wherein the single uplink channel transmission is transmitted from at least one of a primary cell or a primary second cell configured for the UE.

13. The apparatus of claim 1, the memory further comprising instructions executable by the at least one processor to cause the UE to:
determine a first number of HARQ processes if an individual acknowledgement is used for a downlink channel transmission; and
determine a second number of HARQ processes if a group acknowledgement is used for a downlink channel transmission.

14. The apparatus of claim 1, wherein at least two of the plurality of downlink channel transmissions are associated with a same HARQ process.

15. An apparatus for wireless communications by a base station, comprising:
at least one processor; and
memory coupled to the at least one processor, the memory comprising instructions executable by the at least one processor to cause the base station to:

send, to a user equipment (UE), a plurality of downlink channel transmissions, wherein each of the downlink channel transmissions is sent using a first transmission time interval (TTI) that is reduced relative to a legacy TTI; and receive, in a single uplink channel transmission sent using a second TTI that is larger than the first TTI, a group acknowledgement indicating whether or not the downlink channel transmissions were successfully received by the UE.

16. The apparatus of claim 15, wherein:
the legacy TTI has a duration corresponding to a subframe duration; and
the second TTI has a duration corresponding to a duration less than a subframe.

17. The apparatus of claim 16, wherein the first TTI has a duration corresponding to a symbol duration.

18. The apparatus of claim 15, wherein the group acknowledgement is used to acknowledge downlink channel transmissions sent in multiple time slots of one or more subframes.

19. The apparatus of claim 15, wherein the group acknowledgement is used to acknowledge downlink channel transmissions sent in a second time slot of a first subframe and a first time slot of a second subframe.

20. The apparatus of claim 15, the memory further comprising instructions executable by the at least one processor to cause the base station to transmit an indication to use the group acknowledgment or an individual acknowledgement for a downlink channel transmission.

21. The apparatus of claim 20, wherein the indication is at least one of a semi-static signaling or a dynamic signaling.

22. The apparatus of claim 21, wherein the indication is based on at least one of a channel state information (CSI) or a reference signal receive power (RSRP) measurement.

23. The apparatus of claim 15, the memory further comprising instructions executable by the at least one processor to cause the base station to retransmit a downlink channel transmission that was negatively acknowledged in the group acknowledgement.

24. The apparatus of claim 15, wherein the second TTI is the same as the legacy TTI.

25. The apparatus of claim 15, wherein the downlink channel transmissions are transmitted on one or more carriers configured for the UE.

26. The apparatus of claim 15, wherein the single uplink channel transmission is transmitted from at least one of a primary cell or a primary second cell configured for the UE.

27. The apparatus of claim 15, the memory further comprising instructions executable by the at least one processor to cause the base station to:
determine a first number of HARQ processes if an individual acknowledgement is used for a downlink channel transmission; and
determine a second number of HARQ processes if a group acknowledgement is used for a downlink channel transmission.

28. The apparatus of claim 15, wherein at least two of the plurality of downlink channel transmissions are associated with a same HARQ process.

29. An apparatus for wireless communications, comprising:
means for receiving, from a base station, a plurality of downlink channel transmissions, wherein each of the downlink channel transmissions is sent using a first transmission time interval (TTI) that is reduced relative to a legacy TTI; and
means for providing, in a single uplink channel transmission sent using a second TTI that is larger than the first TTI, a group acknowledgement indicating whether or not the downlink channel transmissions were successfully received by a UE.

30. An apparatus for wireless communications, comprising:
means for sending, to a user equipment (UE), a plurality of downlink channel transmissions, wherein each of the downlink channel transmissions is sent using a first transmission time interval (TTI) that is reduced relative to a legacy TTI; and
means for receiving, in a single uplink channel transmission sent using a second TTI that is larger than the first TTI, a group acknowledgement indicating whether or not the downlink channel transmissions were successfully received by the UE.

31. A non-transitory computer-readable medium for wireless communications by a user equipment (UE), comprising instructions executable by at least one processor to cause the UE to:
receive, from a base station, a plurality of downlink channel transmissions, wherein each of the downlink channel transmissions is sent using a first transmission time interval (TTI) that is reduced relative to a legacy TTI; and
provide, in a single uplink channel transmission sent using a second TTI that is larger than the first TTI, a group acknowledgement indicating whether or not the downlink channel transmissions were successfully received by the UE.

32. A non-transitory computer-readable medium for wireless communications by a base station, comprising instructions executable by at least one processor to cause the base station to:
send, to a user equipment (UE), a plurality of downlink channel transmissions, wherein each of the downlink channel transmissions is sent using a first transmission time interval (TTI) that is reduced relative to a legacy TTI; and
receive, in a single uplink channel transmission sent using a second TTI that is larger than the first TTI, a group acknowledgement indicating whether or not the downlink channel transmissions were successfully received by the UE.

* * * * *